(12) United States Patent
Abe et al.

(10) Patent No.: US 11,269,438 B2
(45) Date of Patent: Mar. 8, 2022

(54) ELECTRONIC DEVICE

(71) Applicants: PIONEER CORPORATION, Tokyo (JP); TOHOKU PIONEER CORPORATION, Yamagata (JP)

(72) Inventors: Makoto Abe, Yamagata (JP); Masato Saito, Yamagata (JP); Masakazu Takahashi, Yamagata (JP); Kohei Toyoda, Yamagata (JP)

(73) Assignees: PIONEER CORPORATION, Tokyo (JP); TOHOKU PIONEER CORPORATION, Yamagata (JP)

( * ) Notice: Subject to any disclaimer, the term of this patent is extended or adjusted under 35 U.S.C. 154(b) by 226 days.

(21) Appl. No.: 15/735,799

(22) PCT Filed: Jun. 12, 2015

(86) PCT No.: PCT/JP2015/067096
§ 371 (c)(1),
(2) Date: Dec. 12, 2017

(87) PCT Pub. No.: WO2016/199309
PCT Pub. Date: Dec. 15, 2016

(65) Prior Publication Data
US 2020/0033985 A1    Jan. 30, 2020

(51) Int. Cl.
*G06F 3/041*    (2006.01)
*G06F 3/0354*   (2013.01)
(Continued)

(52) U.S. Cl.
CPC ........ *G06F 3/0414* (2013.01); *G06F 3/03547* (2013.01); *G06F 3/04883* (2013.01);
(Continued)

(58) Field of Classification Search
CPC .............. G06F 3/0414; G06F 3/03547; G06F 3/04883; G06F 3/04847;
(Continued)

(56) References Cited

U.S. PATENT DOCUMENTS 5,214,780 A * 5/1993 Ingoglia ............. G06F 11/3414
                                                714/E11.193
2004/0021663 A1 * 2/2004 Suzuki .................... G06F 3/016
                                                345/419
(Continued)

FOREIGN PATENT DOCUMENTS

JP    2001202192 A  *  7/2001
JP    2001202192 A     7/2001
(Continued)

OTHER PUBLICATIONS

International Search Report dated Aug. 25, 2015; Application No. PCT/JP2015/067096.

*Primary Examiner* — David D Davis
(74) *Attorney, Agent, or Firm* — Nixon & Vanderhye

(57) ABSTRACT

An electronic device which can simplify operation when displaying an active window or an inactive window is provided. The active window or the inactive window is displayed on a display section arranged in a position different from an operation input section based on a comparison of a pressing force to the operation input section and a reference value. Therefore, the active or inactive window can be displayed by one action, and thereby operation can be simplified.

15 Claims, 7 Drawing Sheets

(51) Int. Cl.
*G06F 3/0488* (2013.01)
*G06F 3/04883* (2022.01)
*B60K 35/00* (2006.01)
*B62D 1/04* (2006.01)
*G06F 3/0484* (2013.01)
*G06F 3/04847* (2022.01)

(52) U.S. Cl.
CPC ...... *B60K 35/00* (2013.01); *B60K 2370/1434* (2019.05); *B60K 2370/1529* (2019.05); *B62D 1/046* (2013.01); *G06F 3/04847* (2013.01)

(58) Field of Classification Search
CPC ......... G06F 2203/04105; G06F 3/0488; B60K 2370/1529; B60K 2370/1434; B60K 35/00; B60K 2370/115; B60K 37/06; B60K 2370/1438; B62D 1/046
See application file for complete search history.

(56) References Cited

U.S. PATENT DOCUMENTS

| | | | | |
|---|---|---|---|---|
| 2008/0071177 | A1* | 3/2008 | Yanagidaira | A61B 5/024 600/483 |
| 2010/0057235 | A1* | 3/2010 | Wang | G06F 3/03547 700/94 |
| 2011/0145863 | A1* | 6/2011 | Alsina | G06F 3/0482 725/44 |
| 2011/0224897 | A1* | 9/2011 | Tan | G01C 21/3664 701/532 |
| 2012/0249473 | A1* | 10/2012 | Suzuki | B60K 37/06 345/174 |
| 2013/0293585 | A1 | 11/2013 | Sudou | |
| 2013/0335373 | A1 | 12/2013 | Tomiyasu | |
| 2015/0130830 | A1 | 5/2015 | Nagasaki | |
| 2015/0149899 | A1* | 5/2015 | Bernstein | G06F 3/016 715/702 |
| 2015/0317044 | A1* | 11/2015 | Abe | G01C 21/365 345/629 |
| 2018/0253200 | A1* | 9/2018 | Abe | B60K 37/00 |

FOREIGN PATENT DOCUMENTS

| | | |
|---|---|---|
| JP | 2009252095 A | 10/2009 |
| JP | 2014191611 A | 10/2014 |
| JP | 201576032 A | 4/2015 |
| WO | 2012114760 A1 | 8/2012 |
| WO | 2012098872 A1 | 6/2014 |

\* cited by examiner

ELECTRONIC DEVICE

BACKGROUND OF THE INVENTION

Field of the Invention

The present invention relates to an electronic device including a display section and an operation input section.

Description of the Related Art

Conventionally, a display method simultaneous displaying multiple information on information terminal as an electronic device is suggested (for example, see Patent Literature 1). In the display method of the conventional electronic device described in Patent Literature 1, one information is displayed on a center portion of the electronic device as main information, the other information is displayed near the center portion and behind it, and thereby multiple information are superposed and displayed. Further, a touch panel (operation input section) is provided in a display section so as to switch main information by an operation on the touch panel.

CITATION LIST

Patent Literature

Patent Literature 1: JP 2015-76032 A

SUMMARY OF THE INVENTION

Technical Problem

In the display method of the electronic device described in the Patent Literature 1, input is performed by the touch panel, and the display section and the operation input section are arranged in the same location. Therefore, main information is easily switched. However, in the electronic device which arranges the display section and the operation input section at different locations, when switching main information, it is necessary to select information for example by moving the cursor on a display screen and clicking, or to operate a dedicated key for selecting. As a result, operation becomes troublesome. Further, when an active window (window capable of inputting information) or inactive window (window indicating current information and not capable of inputting information) is selected and displayed, the same problem may occur.

BRIEF SUMMARY OF THE INVENTION

Thus, an object of the present invention is to provide an electronic device which can simplify operation when displaying an active window or inactive window as one example.

Solution to Problem

In order to solve the above problem and to achieve the object, an electronic device of the present invention includes a display section and an operation input section arranged in a position different from the display section. The active window or the inactive window are displayed based on a comparison of a pressing force to the operation input section and a reference value of the pressing force.

DESCRIPTION OF THE PREFERRED EMBODIMENT

Figure 1:
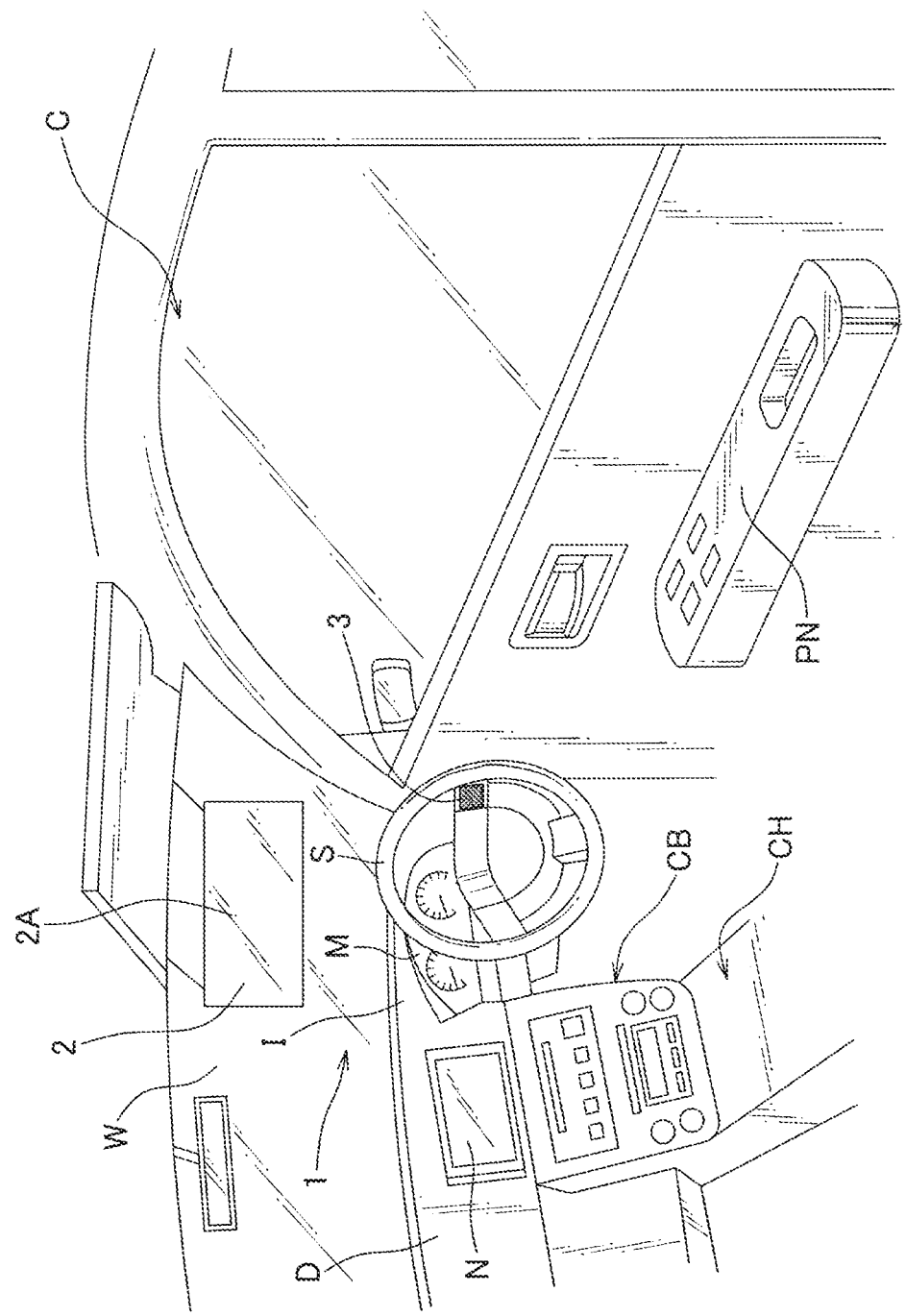
FIG. 1 is a perspective view showing a vehicle including an electronic device according to an embodiment of the present invention.

Hereafter, an embodiment of the present invention will be explained. An electronic device according to the embodiment of the present invention includes a display section, and an operation input section provided at a position different from the display section. The electronic device displays an active window or an inactive window on the display section based on comparison of a pressing force to the operation input section by a pressing body with a reference value of the pressing force.

Since the active window or the inactive window is displayed on the display section based on the comparison of the pressing force to the operation input section with the reference value, the active window or the inactive window can be displayed by one operation, and thereby operation can be simplified. Further, while the operation input section is pressed, the active window or the inactive window may continue to be displayed. Alternatively, the active window or the inactive window may keep on being displayed after the operation input section is not pressed.

When the pressing force is equal to or larger than the reference value, it is preferable to display the active window on the display section. Further, when pressing force is smaller than the reference value, it is preferable to display the inactive window on the display section. Thereby, when the pressing force is small, the inactive window not capable of inputting is displayed, and when the pressing force is large, the active window capable of inputting is displayed. Therefore, the active window is difficult to be displayed if it is not intended by an operator, and thereby erroneous input can be prevented. Also, when the pressing force is equal to the reference value, the electronic device may be configured to display the active window on the display section, or to display the inactive window on the display section. Either may be adopted.

Preferably, the inactive window is display including current information which can be modified in the active window. Thereby, when inputting information on the active window, the inactive window is displayed and current information can be confirmed.

While the operation input section is pressed, it is preferable that the inactive window becomes obvious as the pressing force becomes large and approaches the reference value. Thereby, the inactive window becomes obvious as the pressing force becomes larger. That is, an intuitive operation can be performed by becoming more visible. Furthermore, the inactive window becomes obvious like that, the active window is displayed when the pressing force is larger than the reference value, and then the display is switched. Therefore, performance can be improved.

While the operation input section is pressed by the pressing force smaller than the reference value, the inactive window may become latent as the pressing force becomes decreased. Thereby, the inactive window becomes latent with decreasing the pressing force. That it, intuitive operation can be performed by becoming difficult to recognize visibly. Further, the above structure may be combined with the structure that the inactive window becomes obvious as the pressing force becomes large as described above. In other words, when the pressing force goes up and down within a range less than the reference value, the inactive window may become obvious or latent depending on the pressing force.

A display method of the electronic device according to the embodiment of the present invention includes an acquiring step obtaining a pressing force to an operation input section by a pressing body; a comparing step comparing the pressing force with a reference value; and a displaying step displaying an active window or an inactive window on a display section arranged in a position different from the operation input section based on a comparison result in the comparing step. According to the display method of the electronic device, in common with the electronic device of the above embodiment, operation when displaying the active window or the inactive window can be simplified.

In the comparing step, it is preferable that the active window is displayed on the display section when the pressing force is equal to or larger than the reference value, and the inactive window is displayed on the display section when the pressing force is smaller than the reference value. Therefore, the active window is difficult to be displayed if an operator does not intend to display it, and erroneous input can be suppressed.

The display method of the electronic device further includes a calculating step calculating a ratio of the pressing force for the reference value when the pressing force is smaller than the reference value. In the displaying step, it is preferable that the inactive window is displayed with a display intensity according to the ratio when the pressing force is smaller than the reference value. Thereby, the inactive window is displayed with the display intensity according to the ratio of the pressing force for the reference value. That it, the higher the ratio becomes, the higher the display intensity increases. As a result, an intuitive operation can be performed. Furthermore, when the operation input section continues to be pressed, the display intensity may be changed according to the ratio.

Example

Figure 2:
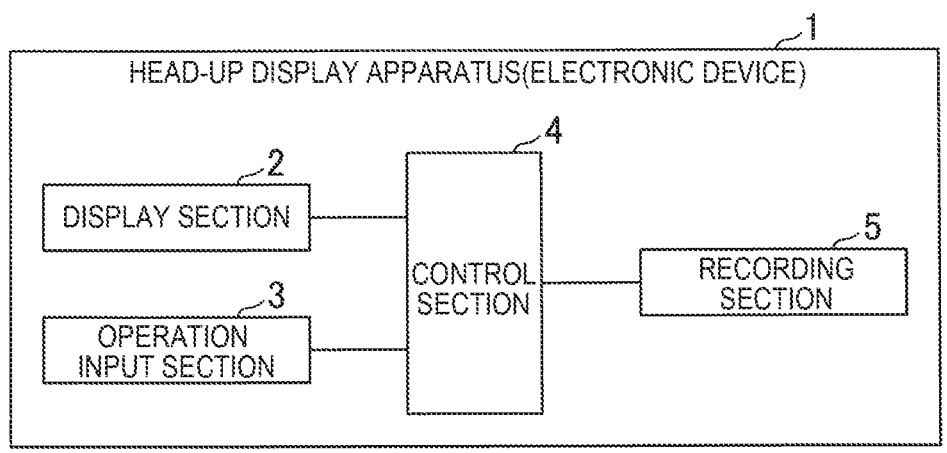
FIG. 2 is a block diagram showing a schematic configuration of the electronic device.
Figure 3A:
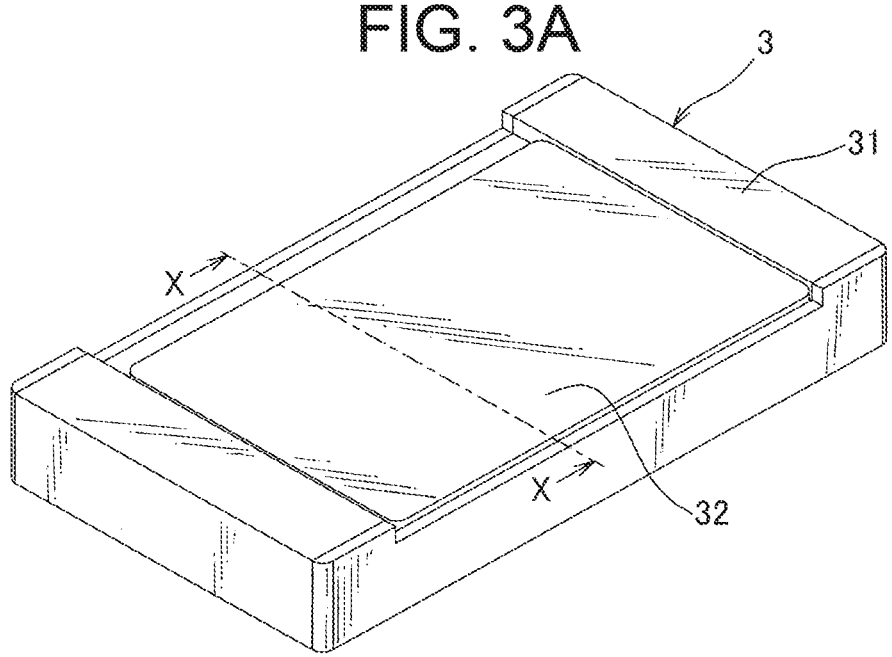
FIG. 3A is a perspective view showing an operation input section of the electronic device.
Figure 3B:
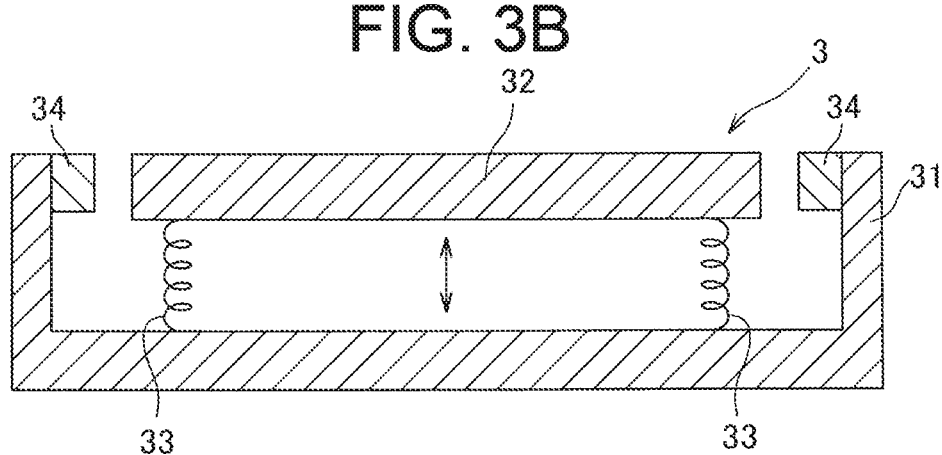
FIGS. 3B and 3C are cross sectional views showing the operation input section of the electronic device.
Figure 3C:
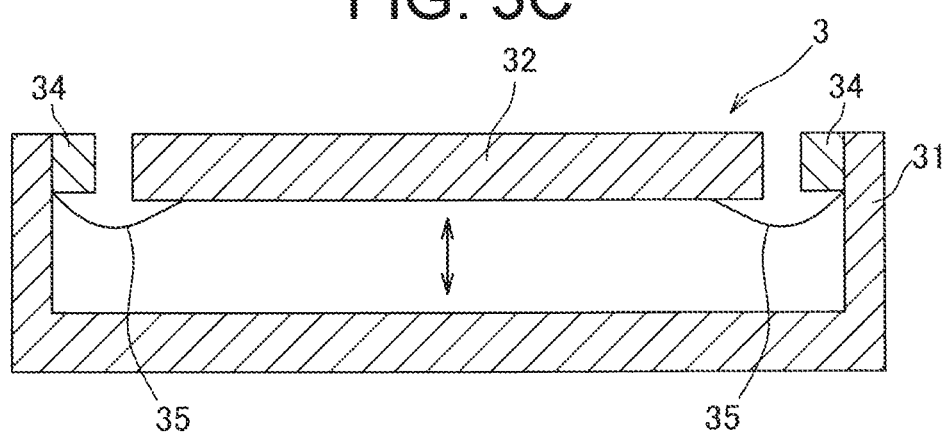
Figure 4:
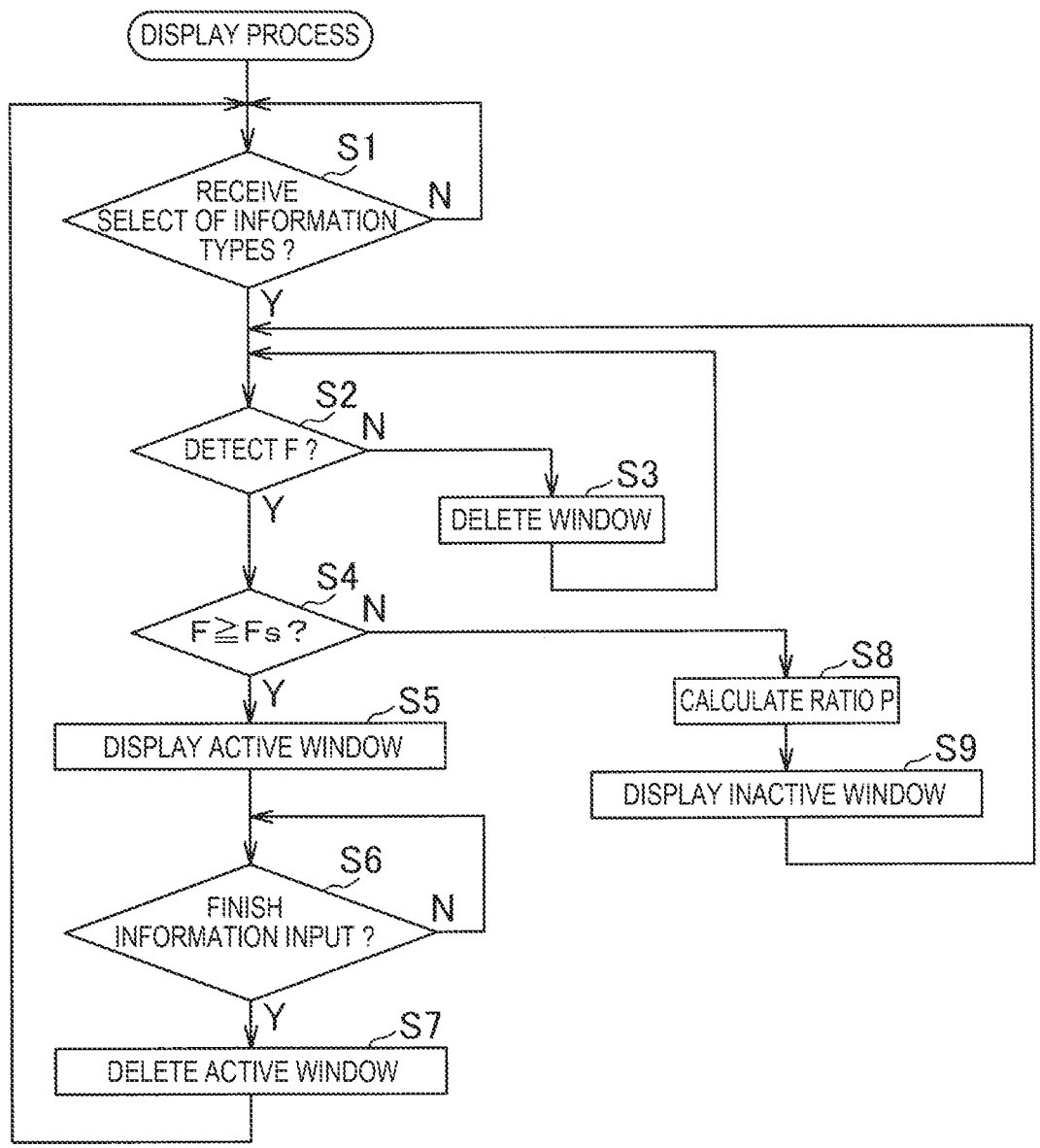
FIG. 4 is a flowchart showing one example of display process executed by a control section of the electronic device.
Figure 5A:
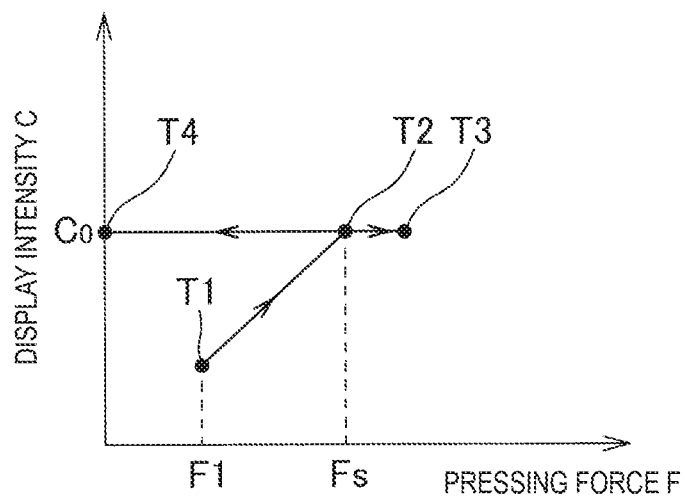
FIGS. 5A to 5C are graphs showing a relationship between a pressing force and a display intensity in the electronic device.
Figure 5B:
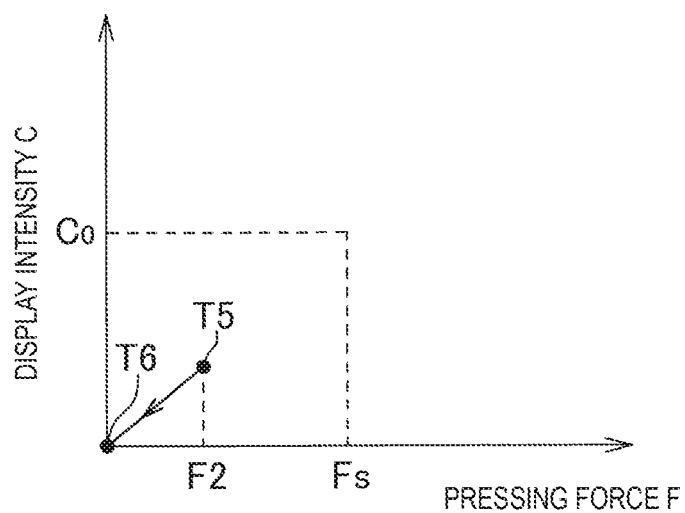
Figure 5C:
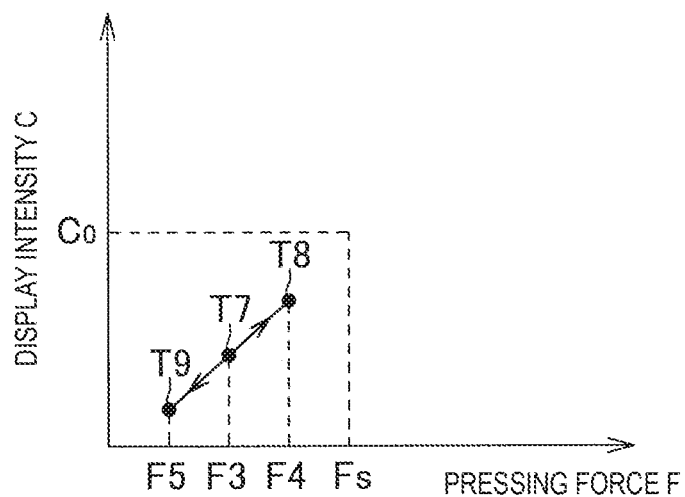
Figure 6A:
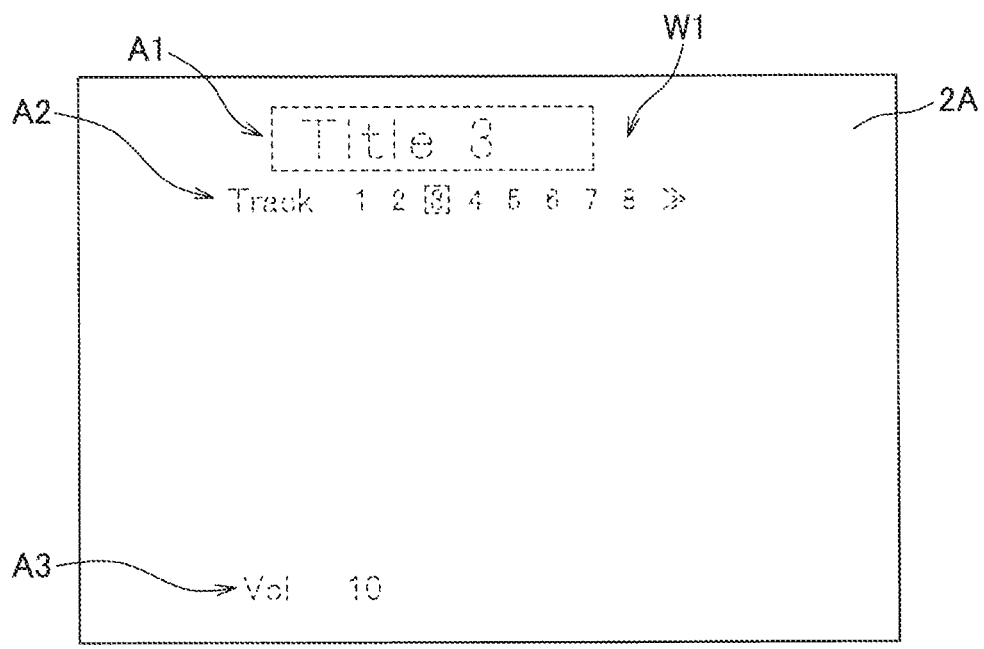
FIGS. 6A and 6B are front views showing one example of an inactive window and an active window displayed on the display section of the electronic device.
Figure 6B:
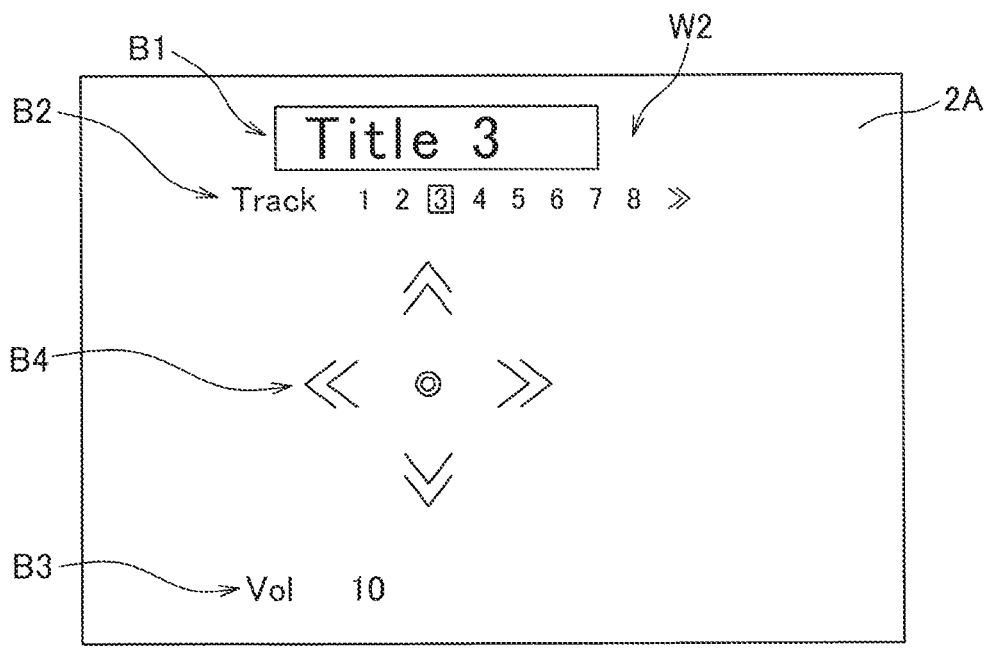
Figure 7A:
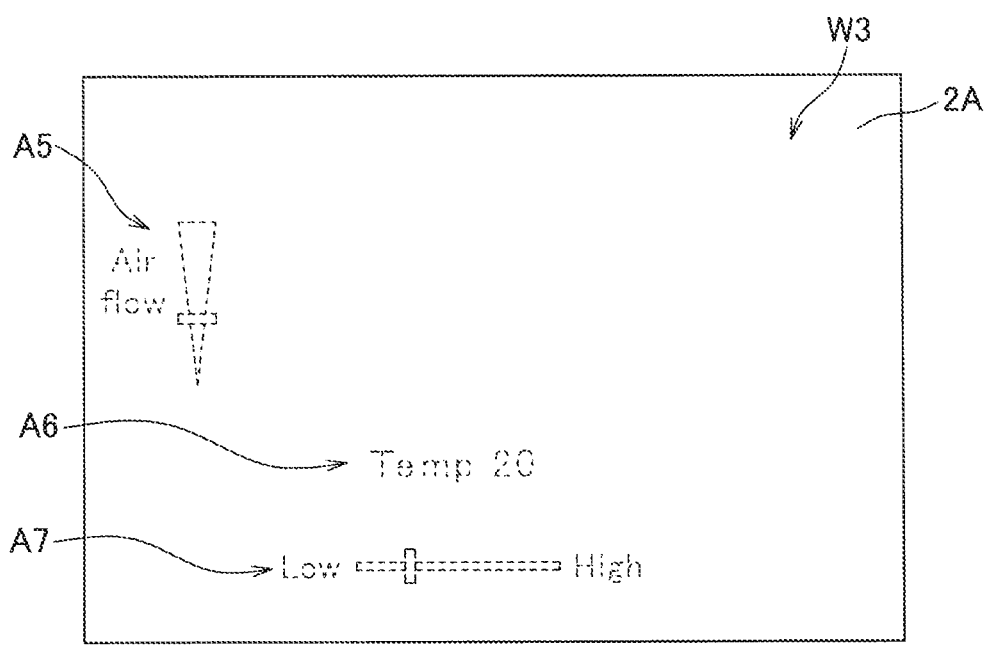
FIGS. 7A and 7B are front views showing another example of the inactive window and the active window displayed on the display section.
Figure 7B:
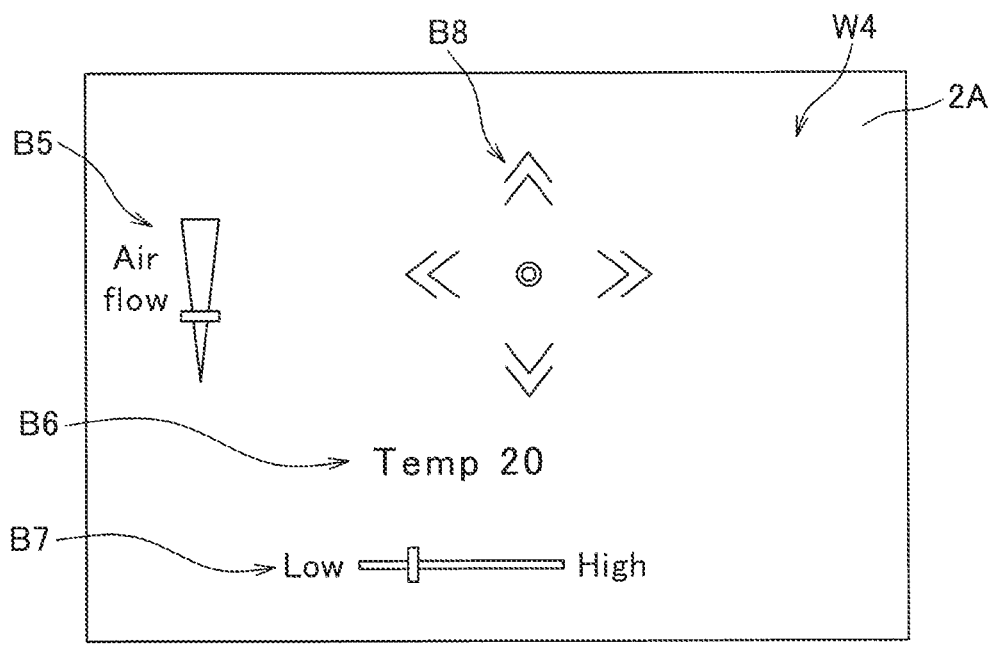

Hereafter, an embodiment of the present invention will be explained in detail. FIG. 1 is a perspective view showing a vehicle C including an electronic device 1 according to an embodiment of the present invention. FIG. 2 is a block diagram showing a schematic configuration of the electronic device 1. FIG. 3A is a perspective view showing an operation input section 3 of the electronic device 1, and FIGS. 3B and 3C are cross sectional views showing the operation input section 3 of the electronic device 1. FIG. 4 is a flowchart showing one example of display process executed by a control section 4 of the electronic device 1. FIGS. 5A to 5C are graphs showing a relationship between a pressing force F and a display intensity C in the electronic device 1. FIGS. 6A and 6B are front views showing one example of an inactive window and an active window displayed on the display section 2 of the electronic device 1. FIGS. 7A and 7B are front views showing the other example of the inactive window and the active window displayed on the display section 2.

As shown in FIGS. 1 and 2, the electronic device 1 of the embodiment in the present invention is a head-up display apparatus arranged in a vehicle C, and includes a display section 2 provided at a driver seat side of a windshield (front glass) W, an operation input section 3 provided in a steering wheel S, a control section 4 controlling the whole the electronic device 1, and a recoding section 5 recording various information.

The display section 2 displays an image on a display screen 2A at the driver seat side by reflecting irradiation light due to an irradiation machine installed in an instrument panel of the vehicle. The display section 2 is constructed by a member having a translucency, and a driver can visually recognize a view outside the vehicle through the display section 2. The display section 2 receives a signal from the control section 4, and displays an image according to the signal. Further, the display section 2 is constructed so as to display an active window or an inactive window. The active window means an image for accepting input or change of information, and the inactive window means an image for displaying current information and not accepting input and change. Also, the display section is not limited to it provided in the head-up display apparatus. For example, it may be a display screen of a navigation device N or a display screen provided in a meter M. Herein, present indicates for example a state that when or immediately before a user inputs information in the operation input section 3. Further, current information indicates for example information already inputted in the electronic device 1 when a user inputs information in the operation input section 3.

In the embodiment of the present invention, the driver visually recognizes a view outside the vehicle through the display section 2. Thereby, the higher the display intensity (for example, light intensity) on the display section 2 is, the more visual the display recognize. Further, outside view overlapping with a display portion is hard to see, and transparency is decreased. On the other hand, the lower the display intensity (for example, light intensity), the more visual the display recognize. Further, outside view overlapping with the display portion is easily to visually see, and transparency is increased. Also, decreasing transparency and visibly seeing display is called as "become obvious", and increasing transparency and hardly seeing display is called as "become latent".

As shown in FIGS. 3A to 3B, the operation input section 3 is a touch pad provided in a position a driver can operate without taking his hands from a steering wheel S. FIG. 3B is a cross-sectional view taken along X-X line of FIG. 3A. The operation input section 3 has a box-shaped case 31 in which an upper surface is opened, an operation plate 32 covering an opening of the case 31 and movably arranged in a vertical direction (a direction perpendicular to the plate), a spring member 33 supporting the operation plate 32, and a sensor 34 outputting electric signal according to an amount of the movement of the operation plate 32 in vertical direction. Also, as shown in FIG. 3C, instead of the spring member 33, for example an edge (or damper) 35 made of fabric, rubber material, polyurethane and the like may be used. An upper surface of the operation plate 32 is a flat contact surface, and the operation input section 3 is operated by touching the contact surface with a finger of the driver as a pressing body. More specifically, the operation input section 3 detects a pressing force by the sensor 34 for example when the driver taps the contact surface with a finger or slides a finger, and detects movement of the finger. The operation input section 3 send a signal including the detected pressing force and information on the movement of the finger on the contact surface to the control section. Moreover, the operation input section 3 only has to be provided in a position different from the display section 2. For example, the operation input section 3 may be arranged in an operation panel PN of a door positioned in a right side of the driver, or a position around a console box CB, a cup holder CH, an instrument panel I, a dashboard D, and so on which are positioned in left side. Alternatively, it may be arranged in a position around a front passenger seat or a back seat.

The control section 4 is constructed by a CPU (Central Processing Unit) having a memory such as a RAM (Random Access Memory) and a ROM (Read Only Memory). Further, the control section 4 may be one for example provided in the head-up display apparatus, or provided in the navigation device N. The control section 4 sends a signal to the display section 2 so as to display an image on the display section 2 according to the signal received from the operation input section 3 or another operation section.

The recoding section 5 is constructed by for example a hard disc or a non-volatile memory, and records the reference value Fs of the pressing force described below. Further, the recoding section 5 may be arranged for example in the head-up display apparatus or the navigation device N.

Hereafter, a procedure of a display process executed by the control section 4 will be explained with reference to FIG. 4 as a display method of the electronic device 1. In the embodiment of the present invention, an example adopting a structure displaying the active window on the display section 2 in a case that the pressing force F is equal to the reference value Fs is mentioned. Firstly, for example, when an ignition of the vehicle is ON, the electronic device 1 being the head-up display apparatus starts, and the display process is performed. The control section 4 receives a select of information types displayed on the display section 2 (S1). In other words, as described below, a user (driver) selects types of information (for example, information about sound played in the vehicle, information of setting an air conditioner, and so on) included in the active window or inactive window. Further, the select of information types may be selected by operation of the operation input section 3, or may be selected by operation of another operation section. When the select of information types so as to display is received (in case of Y in S1), the control section 4 is determined whether the pressing force F is detected or not in the operation input section 3 (S2, acquiring step). When the pressing force F is not detected (in case of N in S2), the control section 4 deletes the inactive window from the display section 2 (S3), and then it is again returned to S2.

When the pressing force F is detected (in case of Y in S2), the control section 4 is determined whether or not the pressing force F is equal or larger than the reference value Fs (S4, comparing step). When the pressing force F is equal or larger than the reference value Fs (in case of Y in S4), the control section 4 displays the active window on the display section 2 depending on information type selected in S1 (S5, displaying step), and it is repeatedly determined whether or not information input on the active window is finished (S6). Further, when the inactive window has already been displayed, the active window is displayed after deleting the inactive window in S5. After information input has been finished (in case of Y in S6), the control section 4 deletes the active window from the display section 2 (S7), and it is again returned to S1.

Meanwhile, when the pressing force F is smaller than the reference value Fs (in case of N in S4), the control section 4 calculates a ratio P by dividing the pressing force F by the reference value Fs (S8, calculating step), and displays the inactive window on the display section 2 depending on information type selected in S1 by the display intensity C according to the ratio P calculated in S8 (S9, displaying step). In this time, for example a value multiplying the display intensity C of the active window by the ratio P may be the display intensity C. The control section 4 maintains a display in S9, and it is again returned to S2. The display process described above is repeatedly executed while the electronic device 1 starts.

Herein, a specific example of change of the display intensity C when changing the pressing force F will be explained based on FIG. 5. Firstly, a case pressing by the pressing force F smaller than the reference value Fs, continuing to press, and gradually increasing the pressing force F is considered. As shown in FIG. 5A, the pressing force at a time (T1) when the pressing force F is firstly detected is F1. The ratio P at this time is F1/Fs, and the display intensity C becomes C0 (F1/Fs). S2, S4, S8 and S9 of the display process are repeated by continuing to press, and the display intensity C increases in proportion to the pressing force F by increasing the pressing force F. At a time (T2) when the pressing force F is equal to the reference value Fs, the inactive window is deleted, and the active window is displayed. The display intensity C at this time is C0, and then it is maintained constant although the pressing force F is increased (T3). Further, although the pressing force F is decreased (T4), the display intensity C is maintained at C0, and the display of the active window is continued.

Next, a case pressing by the pressing force F smaller than the reference value Fs, continuing to press, and gradually decreasing the pressing force F is considered. As shown in FIG. 5B, the pressing force at a time (T5) when the pressing force F is firstly detected is F2. The ratio P at this time is F2/Fs, and the display intensity C becomes C0 (F2/Fs). S2, S4, S8 and S9 of the display process are repeated by continuing to press, and the display intensity C decreases in proportion to the pressing force F by decreasing the pressing force F. When the pressing force F becomes 0 (T6), the pressing force in S2 of the display process is not detected, the inactive window is deleted in S3, and the display intensity C becomes 0.

Further, a case pressing by the pressing force F smaller than the reference value Fs, and going up and down the pressing force F within a range smaller than the reference value Fs is considered. As shown in FIG. 5C, the pressing force at a time (T7) when the pressing force F is firstly detected is F3. When the pressing force F is gradually increased by continuing to press, S2, S4, S8 and S9 of the display process are repeated. When the pressing force becomes F4 larger than F3 (T8), the display intensity C at the point of T8 becomes larger than that at the point of T7. Thereafter, when pressing continues and the pressing force F is gradually decreased, S2, S4, S8 and S9 of the display process are repeated. When the pressing force becomes F5 smaller than F3 and F4 (T9), the display intensity C at the point of T8 becomes smaller than that at the points of T7 and T8. In this manner, the pressing force F may be repeatedly changed up and down.

Herein, a specific example of the active window and the inactive window will be explained. Firstly, in a case that reproduction audio (music) in the vehicle is information type, the inactive window W1 and the active window W2 are explained with reference to FIGS. 6A and 6B. As shown in FIG. 6A, the inactive window W1 has a title display portion A1 displaying a title of music currently playing, a list display portion A2 displaying a list number of music currently playing among playlists, and a volume display portion A3 indicating a playing volume. The content displayed on each of the display portions A1 to A3 becomes current information.

As shown in FIG. 6B, the active window W2 has a title display portion B1 displaying a title of music selected, a list display portion B2 displaying a list number of music selected among playing lists, a volume display portion B3 indicating a playing volume selected, and a select portion B4 receiving a select. Each of the display portions B1 to B3 of the active window W2 is located on the approximately same position as each of the display portions A1 to A3 of the inactive window W1. The select portion B4 includes four arrow portions toward up, down, left and right, and a circular decision portion located at the center of the arrow portions.

When the active window W2 is displayed, the arrow portion corresponding to the movement is selected by sliding a finger on the operation input section 3. For example, when sliding a finger from left to right, the arrow portion of a right direction is selected and blinked. When tapping the operation input section 3 in a state that the arrow portion is selected, information is inputted or changed according to the arrow portion. That is, when tapping with a state that the arrow portion of an upper direction is selected, the playing volume is increased. Further, when tapping with a state that the arrow portion of a lower direction is selected, the playing volume is decreased. Furthermore, when tapping with a state that the arrow portion of a right direction is selected, next music in playlists is selected. In addition, when tapping with a state that the arrow portion of a left direction is selected, previous music in playlists is selected. Further, a title of music selected is displayed on the title display portion B1. When sliding a finger in a direction opposite to the arrow with a state that the arrow portion is selected (for example, when sliding a finger from up and to down with a state that the arrow portion of the upper direction is selected), the central decision portion is selected. When tapping with a state that the decision portion is selected, input of information is finished, and the active window W2 is deleted. Further, selection or change may be implemented before finishing input of information (actually, change play music or playback volume), or a reservation may be accepted before finishing input and then selection or change may be implemented after finishing input.

Next, in a case that an operating state of an air conditioner in the vehicle is information type, the inactive window W3 and the active window W4 will be explained with reference to FIG. 7. As shown in FIG. 7A, the inactive window W3 has an air volume bar A5 indicating a current air volume, a temperature display portion A6 displaying a current set temperature, and a temperature bar A7 indicating a settable range and the current set temperature. The content displayed on each of the display portions A5 to A7 becomes current information.

As shown in FIG. 7B, the active window W4 has an air volume bar B5 indicating an air volume changed, a temperature display portion B6 displaying a set temperature changed, a temperature bar B7 indicating a settable range and the set temperature changed, and a select portion B8 accepting selection. Each of the display portions B5 to B7 of the active window W4 is located on the approximately same position as each of the display portions of the inactive window W3. The select portion B8 includes four arrow portions toward up, down, left and right, and a circular decision portion located at the center of the arrow portions.

In a case that the active window W4 is displayed, the air volume rises when tapping with a state that the arrow portion of the upper direction is selected, the air volume decreases when tapping with a state that the arrow portion of the down direction is selected, the set temperature raises when tapping with a state that the arrow portion of the right direction is selected, and the set temperature decreases when tapping with a state that the arrow portion of the left direction is selected. Further, display of the air volume bar B5 and the temperature bar B7 is changed according to up and down of the air volume and the set temperature, respectively.

According to the above structure, the active window or the inactive window is displayed on the display section 2 based on the comparison of the pressing force F to the operation input section 3 and the reference value Fs. Therefore, the active window or the inactive window can be displayed with one action, and operation can be simplified.

Further, the input-unavailable inactive window is displayed when the pressing force F is small, and the input-available active window is displayed when the pressing force F is large. Therefore, it is difficult to display the active window if an operator does not intend, and thereby erroneous input can be suppressed.

Further, the inactive window includes changeable current information in the active window. Therefore, when inputting information on the active window, the inactive window is displayed and current information can be confirmed.

Further, while the operation input section 3 is pressed by the pressing force F smaller than the reference value Fs, the display intensity C of the inactive window is changed according to the pressing force F (becomes obvious or latent). Therefore, an intuitive operation can be performed.

Also, the present invention is not limited to the above embodiments. The present invention includes various constitutions in which the object of the present invention can be achieved, and the following modifications are includes in the present invention.

For example, in the above embodiment, although the active window continues to display during a time after displaying the active window and before finishing input, it may be changed to the inactive window when the pressing force F smaller than the reference value Fs is detected during display of the active window. More specifically, for example, a person operating the operation input section 3 again may add the pressing force F being equal to or larger than the reference value Fs to the operation input section 3, and then reaches the pressing force smaller than the reference value Fs by gradually reducing the pressing force F. Alternatively, when the person operating the operation input section 3 again adds the pressing force smaller than the reference value Fs to the operation input section 3, the active window may be changed to the inactive window. According to such structure, it can be easy to switch from the active window to the inactive window, and current information can be easily confirmed.

Further, in the above embodiment, while the operation input section 3 is pressed by the pressing force F smaller than the reference value Fs, the display intensity C of the inactive window is changed according to the pressing force F. However, the present invention may be constructed to predetermine the display intensity of the inactive window such that the display intensity is not changed although the pressing force F is changed.

Further, in the above embodiment, when the pressing force F is not detected in S2 of the display process, the inactive window is deleted from the display section 2 in S3. In other words, the inactive window is displayed only while the operation input section 3 is pressed. However, the present invention may be constructed to continue to display the inactive window after the pressing force F is not detected. For example, display may be maintained for a predetermined time after the pressing force F is not detected, and then may be erased. Alternatively, display may be continued until a person operating a predefined action so as to erase the inactive window (for example, a person operating the operation input section again adds the pressing force smaller than the reference value or equal to or larger than the reference value to the operation input section) is performed. Furthermore, in a case that input is not performed after the active window has been displayed, the active window may be erased after waiting for a predefined time.

Further, in the above embodiment, the active window is displayed when the pressing force F becomes equal to or larger than the reference value Fs, and the inactive window is displayed when the pressing force F becomes smaller than the reference value Fs. However, the present invention may be configured to display the inactive window when the pressing force F becomes equal to or larger than the reference value, and to display the active window when the pressing force becomes smaller than the reference value Fs.

Further, in the above embodiment, although the electronic device 1 is arranged in the vehicle C, the electronic device just has to be arranged in a position in which the display section and the operation input section are different from each other. For example, the electronic device may be a communication terminal such as a laptop computer or a television. Moreover, since the operation input section only has to be one pressed by the pressing body, it is not limited to the touch pad. For example, the operation input section may be a mouse wheel or a remote controller operating a television or the like.

Further, in the above embodiment, decreasing transparency and easily seeing display is referred to as "visualization". The visualization would be one that it is easy to visibly see the window. For example, it may be to extend the window or to move a part of the other window displayed by overlapping to a back side of the window. Furthermore, in the above embodiment, increasing transparency and hardly seeing display is referred to as "latency". The latency would be one that it is hard to visibly see the window. For example, it may be to reduce the window or to move the other window displayed by overlapping to a front side of the window.

Further, although the reference value in the above embodiment can be arbitrarily set, it may be set with a range from 20 gram-weight to 100 gram-weight, further preferably from 20 gram-weight to 30 gram-weight. In addition, when the operation input section is arranged in a steering wheel of the vehicle, the reference value may be set to the same value as the pressing force of a button arranged in the steering wheel of the vehicle or around the steering wheel.

Further, although the reference value in the above embodiment can be arbitrarily set, it may be set with a range from 20 gram-weight to 100 gram-weight, further preferably from 20 gram-weight to 30 gram-weight. In addition, when the operation input section is arranged in a steering wheel of the vehicle, the reference value may be set to the same value as the pressing force of a button arranged in the steering wheel of the vehicle or around the steering wheel.

REFERENCE SINGS LIST 1 electronic device
2 display section
3 operation input section
W1, W3 inactive window
W2, W4 active window

The invention claimed is:
1. An electronic device comprising:
a display section that displays an active window and an inactive window,
wherein, when being displayed, the active window accepts input of information,
wherein, when being displayed, the inactive window displays information and does not accept the input of information; and
an operation input section arranged in a position different from the display section, the operation input section configured to receive a pressing force from a pressing body,
wherein, based on a comparison of the pressing force to the operation input section by the pressing body and a reference value of the pressing force:
i) the display section displays the active window on the display section when the pressing force is larger than a reference value, and
ii) the display section displays the inactive window on the display section when the pressing force is smaller than the reference value.

2. The electronic device according to claim 1, wherein the operation input section is configured so that when the inactive window is being displayed in the display section, upon applying a new pressing force larger than the reference value, the display section is switched to display the active window.

3. The electronic device according to claim 1, wherein the inactive window is displayed with current information which can be modified in the active window by the input of information.

4. The electronic device according to claim 3, wherein while the operation input section is pressed, the inactive window becomes obvious as the pressing force becomes increased and approaches the reference value.

5. The electronic device according to claim 4, wherein while the operation input section is pressed by the pressing force smaller than the reference value, the inactive window becomes latent as the pressing force becomes decreased.

6. The electronic device according to claim 1, wherein, while the inactive window is being displayed in the display section and the operation input section is pressed, display intensity of the inactive window becomes higher as the pressing force becomes increased and approaches the reference value.

7. The electronic device according to claim 1, wherein, the electronic device is an apparatus configured to be arranged in a vehicle.

8. The electronic device according to claim 7, wherein, the apparatus is a head-up display apparatus or a navigation device or a meter.

9. The electronic device according to claim 1, wherein, the electronic device is a communication terminal or a television.

10. A display method of the electronic device comprising:
an acquiring step obtaining a pressing force to an operation input section by a pressing body;
a comparing step comparing the pressing force with a reference value; and
a displaying step displaying, on a display section arranged in a position different from the operation input section, an active window when the pressing force is equal to or larger than the reference value and an inactive window is displayed on the display section when the pressing force is smaller than the reference value,
wherein, when being displayed, the active window accepts input of information, and
wherein, when being displayed, the inactive window displays information and does not accept the input of information.

11. The display method of the electronic device according to the claim 10, wherein, when the inactive window is currently being displayed in the display section, and in the comparing step, the pressing force is larger than the reference value, the display section is switched to display the active window.

12. The display method of the electronic device according to the claim 11, further comprising a calculating step calculating a ratio of the pressing force for the reference value when the pressing force is smaller than the reference value,
wherein in the displaying step, the inactive window is displayed with a display intensity according to the ratio when the pressing force is smaller than the reference value so that the display intensity of the inactive window becomes higher as the pressing force becomes increased and approaches the reference value.

13. The display method of the electronic device according to claim 10, wherein,
the electronic device is an apparatus configured to be arranged in a vehicle.

14. The display method of the electronic device according to claim 13, wherein,
the apparatus is a head-up display apparatus or a navigation device or a meter.

15. The display method of the electronic device according to claim 10, wherein,
the electronic device is a communication terminal or a television.

* * * * *